United States Patent [19]

Taylor

[11] Patent Number: 5,406,072
[45] Date of Patent: Apr. 11, 1995

[54] METHOD FOR MICROBEAM ION RADIATION TESTING OF PHOTONIC DEVICES

[75] Inventor: Edward W. Taylor, Albuquerque, N. Mex.

[73] Assignee: The United States of America as represented by the Secretary of the Air Force, Washington, D.C.

[21] Appl. No.: 206,992

[22] Filed: Mar. 7, 1994

[51] Int. Cl.$^6$ .............................................. G01R 31/28
[52] U.S. Cl. .................................. 250/214.1; 250/216; 250/306; 250/492.21
[58] Field of Search ............. 250/214.1, 214 R, 208.1, 250/208.2, 216, 306, 307, 309, 310, 311, 492.1, 492.21, 492.23

[56] References Cited

U.S. PATENT DOCUMENTS

| | | | |
|---|---|---|---|
| 4,878,104 | 10/1989 | Reed et al. | 357/30 |
| 5,126,553 | 6/1992 | England et al. | 250/211 J |
| 5,140,164 | 8/1992 | Talbot et al. | 250/209 |
| 5,160,991 | 11/1992 | Delacourt et al. | 250/338.4 |
| 5,175,495 | 12/1992 | Brahme et al. | 250/311 |
| 5,247,168 | 9/1993 | Pocholle et al. | 250/214 LS |

Primary Examiner—David C. Nelms
Assistant Examiner—John R. Lee
Attorney, Agent, or Firm—Irwin P. Garfinkle; William G. Auton; Jacob N. Erlich

[57] ABSTRACT

The disclosed method is for radiation testing of a nanostructure photonic device under test (DUT). The method comprises the application of a beam of optical energy to the DUT, and then establishing a computer data base for the performance of the device under test during the application of the beam. Thereafter, a tightly focused, steerable radiation beam is generated and focused on to a selected nano sized area of the DUT. A second data base is established for the performance of the DUT resulting from the application of the radiation beam, and the data of the first data base are compared with the data of said second data base to determine the affects of applying the radiation beam to the DUT, or to alter the device physical properties such as its refractive indicies, absorption, preferred polarization, and electrooptic characteristics, including electrooptic coefficients, photoelastic constants, operational (fundamental) wavelength and coupling coefficients.

8 Claims, 1 Drawing Sheet

METHOD FOR MICROBEAM ION RADIATION TESTING OF PHOTONIC DEVICES

STATEMENT OF GOVERNMENT INTEREST

The invention described herein may be manufactured and used by or for the Government for governmental purposes without the payment of any royalty thereon.

BACKGROUND OF THE INVENTION

This invention relates to an automated, constrained, repeatable and highly accurate method for performing controlled radiation testing, radiation induced annealing, refractive index alteration, altering photonic material constants and space qualification of nanostructure photonic devices. The invention provides a precise, repeatable and simultaneous method for performing diagnostics and tailoring of photonic material and micron and nanometer structure sized regions via radiation induced color center formation or radiation-induced annealing processes at the device atomic and molecular levels.

Alteration and tailoring and measurement of photonic device parameters include: index of refraction, electrooptic coefficients, propagation constants, coupling coefficients, photoelastic constants, absorption constants, and operational optical wavelengths, and other photonic material parameters which are integral to the operation and function of guiding, modulating, attenuating, amplifying, polarizing, filtering, beam shaping, coupling, or controlling optical signals within photonic circuitry. Photonic circuitry includes optical interconnect technologies and systems comprised of components such as emitting lasers, integrated photodetector amplifiers (i.e. Si PIN photodiodes and poly Si thin film transistors) and optical integrated receivers using Ga As MESFET and MSM technologies, etc., fiber optic systems and components (optical fibers, fiber amplifiers, fiber grating, demultiplexers, sources and detectors) and other photonic technologies which are susceptible to radiation induced defects or effects, or can be hardened through annealing and/or wherein color centers can be introduced into selected areas, lengths and volumes to alter the transmissive and other optical and electrical properties of the devices.

Photonic devices include, but are not limited to, integrated optical circuits, optical interconnect technologies, opto-electronic integrated optics, thin-film and guided wave devices, and other nanostructure and micro-sized photonic components such as quantum-well laser diodes, injection laser diodes, fiber optics and fiber optic components, PIN photodiodes, charge-coupled devices, charge-injection devices, etc. The disclosed method uses a focused and defocused ion microbeam to accurately pin-point or distribute radiation on discrete volumes, lengths and areas on or within nanostructure devices. Accuracy on the order of 1-2 microns and larger are currently available using several ion beam accelerators and possibly ion beam milling machines which allow highly accurate exposure of photonic technologies for the purpose of irradiating specific nanostructure regions and excluding or isolating surrounding or adjacent regions from exposure. This three-dimensional exposure technique allows limited radiation testing, annealing and alteration of the refractive index (via color-centers) of specific nanostructure regions without the accumulation of total dose over the entire nanostructure regions. This process facilitates cost-effective and constrained survivability, space qualification and hardness testing with delivery of highly accurate dose and dose rates, and lends itself to on site production line testing.

To date, the normal procedure is to use gross radiation exposure using finite sized radiation beams ranging from unapertured 1-2 $cm^2$ sized beams, located extremely close to the device under test. This arrangement is highly undesirable since proximity between the DUT and output port of the radiation source cause inconveniences in positioning the DUT. In the currently used radiation exposure methods, radiation induced phenomena such as absorption, crosstalk, polarization effects, refractive index changes, etc., cannot be confidently or accurately attributed to the differently composed (doped) regions within these photonic components. This is because the gross size of the radiation beams currently used may overlap two or more regions of the nanometer/micrometer structures which result in compound and complex responses. The aperturing down of these gross dimensional radiation beams effectively reduces the instantaneous dose and dose rates and results in minimizing the radiation doses delivered and the responses being studied. Such aperturing dose not effectively focus the exposure beam and overlapping may again occur, which limits resolution and results in inhomogeneous irradiation of the exposed areas. The method allows alteration of various photonic device physical characteristics via radiation induced color center formation within the material atomic and molecular structure. Thus, tailoring of the photonic material indices of refraction, electrooptic coefficients, photoelectric constants, propagation constants, coupling coefficients, etc. are possible.

The disclosed method avoids these problems and allows the analysis to be performed in a vacuum or partial vacuum or to some extent in air on other gaseous environments. Thus, in vacuum, a space environment can be stimulated and, space qualification procedures can be confidently applied. Also, since the ion microbeam method allows more working space between the DUT and the radiation emission region, thermoelectric coolers and heating devices can be applied readily to the DUT, again allowing additional testing and qualification test procedures to be followed.

SUMMARY OF THE INVENTION

The disclosed method is for radiation testing of a nanostructure photonic device under test (DUT) which comprises the application of a beam of optical energy to the DUT, and then establishing a computer data base for the performance of the device under test during the application of the beam or beams of optical energy. Thereafter, a tightly focused, steerable radiation beam is generated and focused on to a selected nano or micron sized area of the DUT. A second data base is then established for the performance of the DUT resulting from the application of the radiation beam, and the data of the first data base with the data of said second data base are compared to determine the effects of applying radiation beam to the DUT.

BRIEF DESCRIPTION OF THE DRAWINGS

These and other advantages, objects and features of the invention will become more apparent after considering the following description taken in conjunction with the illustrative embodiment in the accompanying drawings, in which.

DETAILED DESCRIPTION OF A PREFERRED EMBODIMENT OF THE INVENTION

Figure 1:
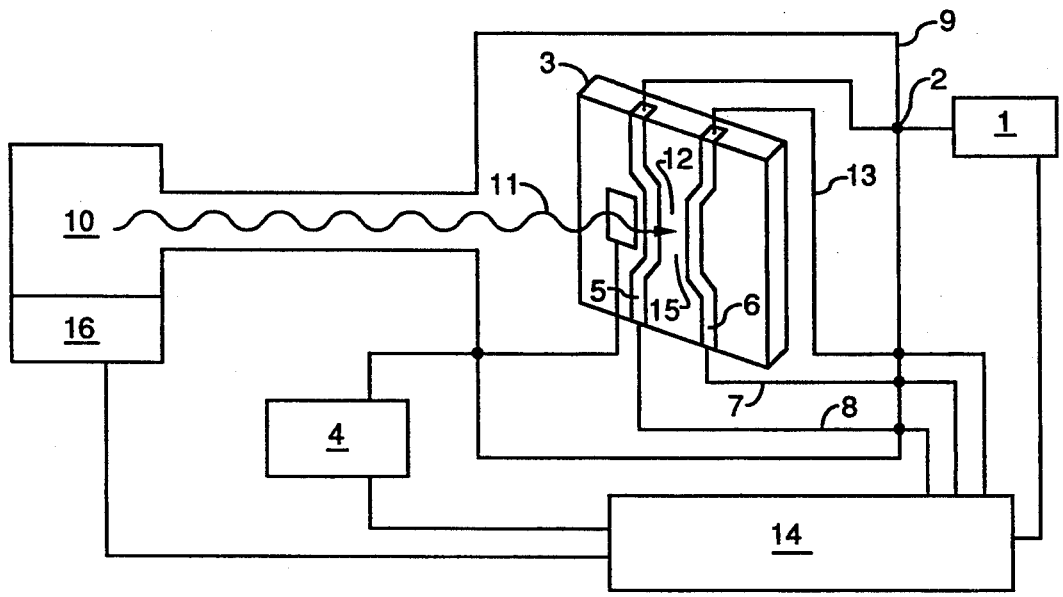
FIG. 1 is a schematic of an arrangement using the invention.

Shown in FIG. 1 is a typical mode for performing ion microbeam techniques to perform the various measurements or operations in accordance with this invention. In FIG. 1, there is shown an optical source 1 which may consist of an injection laser diode, light emitting diode, gas lasers, etc. The energy from the source 1 is coupled via appropriate beam shaping optics (which may be necessary depending on the configuration of a device under test) into an optical fiber transmission system 2, which may be an optical fiber or free spaced optical beam. The energy from the source 1 is coupled through the bulkhead wall of the ion microbeam chamber 9 and directed or connected to the input channel waveguide 5 of a device under test (DUT) 3. In this case, the depicted DUT 3 is a $LiNbO_3$:Ti directional coupler (DC) switch. The DUT 3 is driven by a modulator or other external power source such as a voltage controlled oscillator (VCO) 4, which for the case shown modulates the refractive index of the DC switch 3 via alteration of the electro-optic coefficients. The redirection or transfer of optical energy from the input channel waveguide 5 to the cross-over channel waveguide 6 follows the modulation voltage from the VCO (4). The outputs at 7 and 8 from the channel waveguides along with the back reflected (counter propagating wave) at 13 are fed through the bulkhead wall 9 to a data acquisition system 14.

Once a baseline, non-irradiated operational characterization of the DUT 3 has been established, an ion microbeam nuclear probe 10 is activated to provide energetic ions 11 to specific regions, for example, the regions 12 and 15 on the DUT 3. The ions 11 are steered to these regions by the external data acquisition computer/system 14, the output of which is fed back to the ion microbeam accelerator steering and control system 16 where instrumentation is used to correlate signals resulting from the exposures and, the position of the ion beam 11 on the DUT 3. In this manner, the induced annealing rate of the refractive index alteration of the irradiation area, length or volume can be actively monitored and controlled by the detected device responses.

For example, if the regions 12 and 15 between the channel waveguides 5 and 6 is irradiated by the ions, specific responses such as optical signal attenuation, polarization changes and crosstalk, etc. would be detected and processed immediately by the data acquisition system 14 or stored for later analysis.

Figure 2:
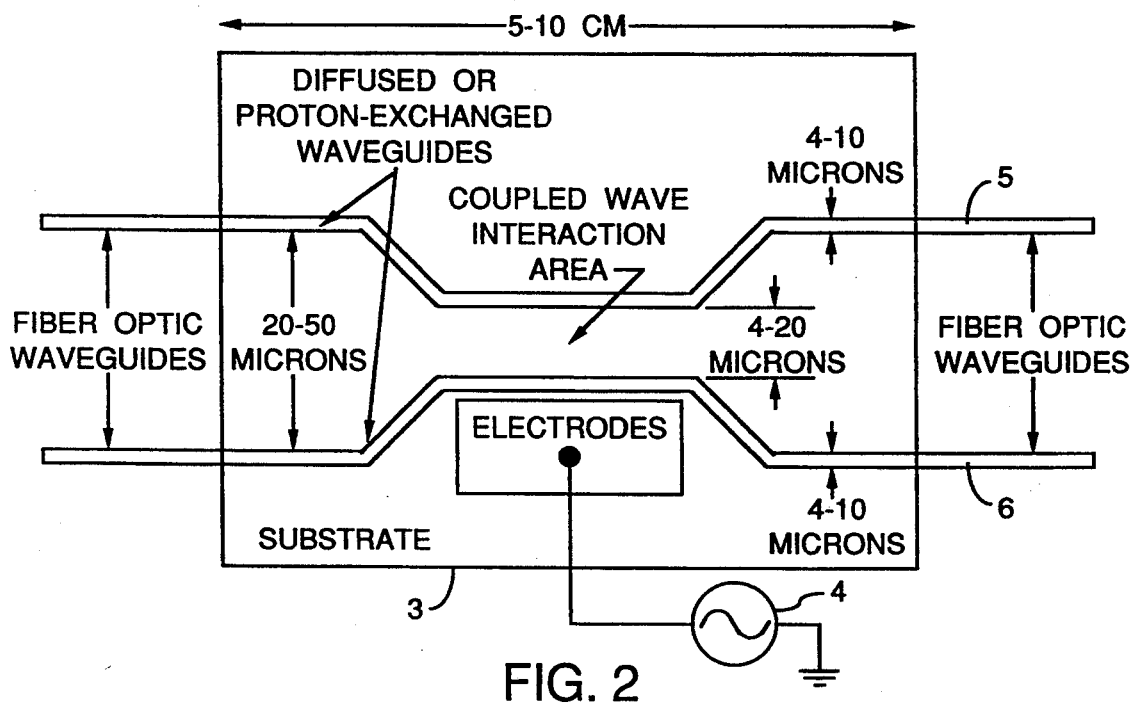
FIGS. 2 and 3 are enlarged portion of FIG. 1.
Figure 3:
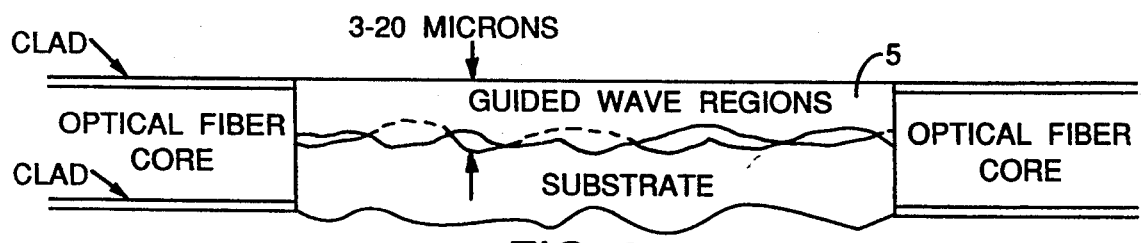

As shown in FIGS. 2 and 3, the regions 12 and 15 on the example DUT 3 range in structure size on the order of microns. Therefore the ability to steer, direct and deposit ions in three dimensions over any regions of this example structure allows a unique methodology and technique for performing SEE, SEU, and total dose radiation testing and analysis. Such analysis can be used in determining the homogeneity of the device structure or even correcting imperfections resulting from the manufacturing process.

The data acquisition system 14 consists of specialized instrumentation schemes in performing electronic and optical measurements such as: polarimeters, digital and analog volt meters, optical detectors and detector arrays, microprocessors and other recording devices.

Thus, this invention provides the ability to selectively irradiate 1–2 micron or smaller or larger areas, lengths and volumes on the same substrate or circuit board, and provides the unique ability to individually ascertain, quantify and study the radiation response, hardness and survivability of each individual photonic component. Thus, failure mechanisms such as SEE, SEU or other radiation-induced phenomena can be accurately isolated and quantified, while minimizing the risk to the remainder of the photonic chip-component from inadvertent radiation exposure. Also selective radiation induced annealing and alteration of the refractive index or birefringent properties of the device material(s) is possible using this technique.

Depth of dose experienced by buried or embedded photonic structures can be controlled directly by the ion beam energy, while dose and dose rate, number of ions and ion species is also controllable. Changes to optical and electrical properties of the photonic devices can be directly studied, which in turn can be correlated or modeled to the response of the device or system. Some of the optical and electrical properties that can be measured using the method of this invention include radiation induced absorption or attenuation of optical signals, refractive index changes, electro-optic coefficients and electro-optic coefficient changes, linear and nonlinear absorption coefficients, photo refractive thresholds and changes to photorefractive sensitivities, gains, quantum efficiencies, changes to signal polarizations, etc.

The measurements performed in accordance with this invention may be in vacuum air, partial vacuum, under dynamic environmental conditions such as temperature cycling and optical signal level changes, signal modulation depths, etc.

The technique of accurately directing the ion beams or other radiation beams to select areas, volumes, or over lengths of the photonic components is especially valuable where the photonic components are integrated or hybrid with high density microelectronic circuitry. The method encompasses the application of a tightly focused high-flux of ions to a desired region of a hybrid microstructure or system. This is unique since up to now wide beam (2 $cm^2$ or larger) radiation exposures have been used to perform the irradiations and measurements. Unfortunately, individual component responses have been masked or clouded due to the wide beam exposures, which have caused uncertainties in analyzing the data. Also, it may be desirable to protect areas, volumes and lengths which must remain radiation sensitive (i.e., to perform as sensors). These sensors may be in proximity to other components of the photonic system and therefore must be protected during the radiation exposure process. In such cases, if only the photonic components radiation responses are of interest, application of a tightly focused ion beam allows only select regions of the hybrid system to be irradiated, thereby protecting or isolating the microelectronic/electronic circuitry.

Another feature of this methodology is the ability to simulate SEE and SEU phenomena on photonics technologies. For example, in optical memory systems, neutral networks or other ultra-dense photonic technologies, SEE and SEU effects can be effectively investigated using these nano and micrometer resolution techniques described above.

The main advantage with the proposed invention is the rapid, accurate, and controllable exposure and probing of nanometer and micrometer photonic structures without inadvertent or unwanted exposure of other areas, volumes and lengths on the structure.

Analytical modeling of the DUT responses are simplified using the disclosed technique, since the tightly focused ion beam exposure of well determined DUT target areas removes the uncertainty of more than one area/volume/length on the DUT from responding to the irradiation. Thus, a systematic and parametric study of discrete areas/volumes/lengths may be performed and applied with confidence in modeling the radiation responses of the DUT or photonic system, or in performing radiation-induced annealing, or in altering the refractive index of certain materials by introducing radiation-induced color-centers.

From a safety point of view, the irradiation of the DUT in air or within the exposure chamber of the ion microbeam can be performed at a greatly reduced risk to personnel. In the normal existing testing of photonic components wherein accelerators such as the White Sands Missile Range electron linear accelerator is used, the entire region near the DUT must be isolated using substantial lead shielding, isolation chambers, distant instrumentation rooms, etc. to guard against stray and direct radiation for human safety purposes and to safeguard sensitive instrumentation.

Use of the ion microbeam method to perform similar radiation testing greatly reduces the exposure of individuals and instrumentation to radiation, thereby being safer, and also reduces costs. Setup times to perform the radiation tests are lessened since lead shielding and isolation distances are minimized or nonexistent, allowing maximum usage of the facility source time. Source tune up, calibration, focusing and operational times are also cost-effective using the ion microbeam techniques proposed herein, compared to traditional wide beam linear accelerators.

By utilizing the proposed microbeam irradiation methodology, a definitive approach to systematically determining the radiation sensitivity of specific photonic component substructures of regions can be achieved, and at a cost reduction since testing can be constrained.

The essence of this invention is to apply a tightly focused, steerable radiation beam, which is highly flexible in providing nuclear species, energy ranges, doses and dose rates over nano and micro structure photonic and hybrid photonic-microelectronic devices, chips, substrates and hybrid compositions. While a ion microbeam radiation source has been exemplified throughout this narrative, this does not exclude any other existing radiation sources which can facilitate the same test features providing precise control of a nanometer/micrometer diameter beam which can be applied to specific nanometer/micrometer sized areas for the purpose of radiation-induced annealing, testing or color-center formation within the area or volumes in proximity to these areas.

What is claimed is:

1. A method for determining the effects of radiation applied to a photonic device under test (DUT), said radiation being applied to said DUT for altering various physical constants of said DUT, said method comprising the steps of:

applying a beam of optical energy to said DUT;

establishing a first data base for the performance of said DUT resulting from the applying of said beam of optical energy;

generating a tightly focused, steerable radiation beam;

steering said radiation beam to a selected area on said DUT;

establishing second data base for the performance of said DUT resulting from the applying of said steerable radiation beam;

comparing the data of said first data base with the data of said second data base to determine the effects of applying said radiation beam on said area of said DUT.

2. The method of claim 1, wherein said DUT is in a vacuum chamber.

3. The method of claim 1 wherein said radiation beam is variable for providing various nuclear species, energy ranges, doses and dose rates.

4. The method of claim 1 wherein said beam of optical energy is a laser beam.

5. A method for radiation testing of a photonic device under test (DUT) comprising the steps of:

applying a beam of optical energy to said DUT;

modulating said beam of optical energy to establish the performance of said DUT without the application of other energy;

establishing a first data base for the performance of said DUT resulting from the applying of said modulated beam of optical energy;

generating a tightly focused, steerable radiation beam;

steering said radiation beam to a selected sized area on said DUT, whereby the performance of said DUT is modified;

establishing a second data base for the performance of said DUT resulting from the applying of said steerable radiation beam;

comparing the data of said first data base with the data of said second data base to determine the effects of applying said radiation beam on said area of said DUT.

6. The method of claim 5, wherein said DUT is in a vacuum chamber.

7. The method of claim 5 wherein said radiation beam is variable for providing various nuclear species, energy ranges, doses and dose rates.

8. The method of claim 5 wherein said optical beam is a laser beam.

* * * * *